3,267,102
REACTION PRODUCTS OF 4,6-DIAMINO-5-NITRO-SOPYRIMIDINES WITH ALKYL BENZOYLACETATES, AND PROCESS OF OBTAINING THE SAME

Thomas S. Osdene, Richmond, Va., assignor to American Home Products Corporation, New York, N.Y., a corporation of Delaware
No Drawing. Filed Oct. 23, 1965, Ser. No. 504,131
9 Claims. (Cl. 260—251.5)

This invention is directed to novel reaction products obtained by reacting 4,6-diamino-5-nitrosopyrimidines with alkyl benzoylacetates, and to a novel process for obtaining said products. Depending upon the reaction conditions used in the process, the products are either 6-benzoyl pteridines or 6-pteridine carboxylic acid esters.

As determined by standard pharmacological procedures with warm-blooded animals, the claimed compounds show diuretic and antiviral properties. These compounds can be formulated conventionally in unit dosage forms by mixing with various carriers and excipients.

The process and the compounds of the invention can be characterized by the following reaction scheme:

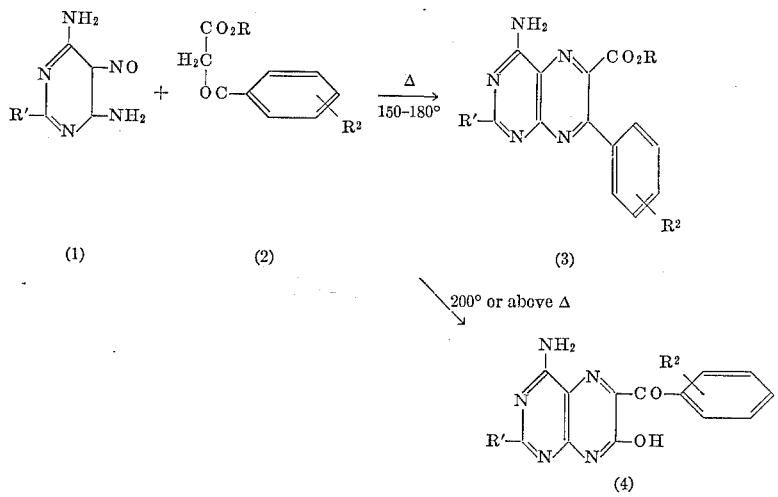

where R is ethyl or methyl; R' is phenyl, 2-thienyl or phenyl substituted by halogen, lower alkyl, lower alkoxy or trifluoromethyl; and $R^2$ is hydrogen, halogen, lower alkyl, lower alkoxy or trifluoromethyl.

Referring now to the above reaction scheme, the compounds of the present invention are prepared by mixing a 4,6-diamino-5-nitrosopyrimidine (1) with an alkyl benzoylacetate (2), and placing the mixture in a vessel which is immersed in an oil bath. If alkyl esters of 6-pteridinecarboxylic acid (3) are desired, the oil bath temperature is maintained at 150° to 180° C. for a sufficient time to substantially complete the reaction. The reaction mixture is cooled and an alkanol solvent, preferably ethanol, is added. The precipitate which results is filtered and can be purified from ethanol.

Where a 6-benzoylpteridine (4) is desired, the above procedure is varied to the extent that the reactants are heated to 200° C. for only about an hour.

Generally a mixture of both products is obtained and these may be separated from one another by extracting the reaction mixture with boiling ethanol to remove the acid product leaving the other as a solid.

The invention is further illustrated by the following examples.

EXAMPLE I

*Preparation of 4-amino-2,7-diphenyl-6-pteridine-carboxylic acid, ethyl ester*

An intimate mixture of 10 g. of 4,6-diamino-5-nitroso-2-phenylpyrimidine and 20 g. of ethyl benzoylacetate were placed into a large tube which was immersed into an oil bath maintained at 150°. A vigorous evolution of vapor quickly started. The tube was heated for 3 hours and, after cooling, 20 ml. of ethanol were added and the solid was removed by filtration. Recrystallization from ethanol afforded 4-amino-2,7-diphenyl-6-pteridinecarboxylic acid, ethyl ester, M.P. 217–218°.

*Analysis.*—Calc.: C, 67.91; H, 4.61; N, 18.82. Found: C, 67.71; H, 4.50; N, 18.75.

EXAMPLE II

*Preparation of 4-amino-2-(p-chlorophenyl)-7-phenyl-6-pteridinecarboxylic acid, ethyl ester*

A mixture of 5 g. of 4,6-diamino-2-(p-chlorophenyl)-5-nitrosopyrimidine and 10 ml. of ethyl benzoylacetate were heated in an oil bath at 150° for 30 mins. A further 5 ml. of ethyl benzoylacetate was added, the temperature was raised to 170° and the mixture was maintained in the bath for 3 hrs., after which a further 5 ml. of ester was added and the temperature of the bath was raised to 180°. After 3 hrs. at that temperature, the mixture was treated with 20 ml. of ethanol and allowed to stand. The solid obtained was removed by filtration and the material was recrystallized from ethanol to afford 4-amino-2-(p-chlorophenyl)-7-phenyl-6-pteridinecarboxylic acid, ethyl ester, M.P. 250–251°.

*Analysis.*—Calc.: C, 62.15; H, 3.97; N, 17.26; Cl, 8.74. Found: C, 61.98; H, 3.89; N, 17.24; Cl, 9.0.

EXAMPLE III

*Preparation of 4-amino-6-benzoyl-7-hydroxy-2-phenylpteridine*

A mixture of 10 g. of 4,6-diamino-5-nitroso-2-phenylpyrimidine and 20 g. of ethyl benzoylacetate was heated for 1 hr. in an oil bath maintained at 200°. About 30 ml. of ethanol were added and the solid formed was removed by filtration. This solid was extracted with 250 ml. of boiling ethanol to remove any of the other product formed and the residue was recrystallized from aqueous 2-ethoxyethanol to afford 4-amino-6-benzoyl-7-hydroxy-2-phenylpteridine, M.P. 317–318°.

*Analysis.*—Calc.: C, 66.46; H, 3.82; N, 20.40. Found: C, 66.30; H, 3.97; N, 20.02.

EXAMPLE IV

*Preparation of 4-amino-6-benzoyl-2-(p-chlorophenyl)-7-hydroxy-pteridine*

Reaction of 4,6-diamino-2-(p-chlorophenyl)-5-nitrosopyrimidine with ethyl benzoylacetate carried out as in Example III afforded 4-amino-6-benzoyl-2-(p-chlorophenyl)-7-hydroxypteridine, M.P. 354°.

*Analysis.*—Calc.: C, 60.41; H, 3.20; N, 18.54; Cl, 9.38. Found: C, 60.08; H, 3.14; N, 18.67; Cl, 9.57.

EXAMPLE V

Condensation of 4,6-diamino-5-nitroso-2-(2-thienyl)pyrimidine with ethyl benzoylacetate at 150–160°, carried out as in Example I, gives 4-amino-7-phenyl-2-(2-thienyl)-6-pteridinecarboxylic acid, ethyl ester.

EXAMPLE VI

Condensation of 4,6-diamino-5-nitroso-2-(p-tolyl)pyrimidine with ethyl p-chlorobenzoylacetate at 150–160°, carried out as in Example II, gives 4-amino-7-(p-chlorophenyl)-2-(p-tolyl)-6-pteridinecarboxylic acid, ethyl ester.

EXAMPLE VII

Condensation of 4,6-diamino-5-nitroso-2-(m-trifluoromethylphenyl)pyrimidine with methyl benzoylacetate, as carried out in Example I, gives 4-amino-7-phenyl-2-(m-trifluoromethylphenyl)-6-pteridinecarboxylic acid, methyl ester.

EXAMPLE VIII

Condensation of 4,6-diamino-2-(p-methoxyphenyl)-5-nitrosopyrimidine with ethyl m-toluoylacetate, as carried out in Example II, gives 4-amino-2-(p-methoxyphenyl)-7-(m-tolyl)-6-pteridinecarboxylic acid, ethyl ester.

EXAMPLE IX

Reaction of 4,6 - diamino - 5 - nitroso - 2 - (o-tolyl)pyrimidine with ethyl benzoylacetate at 200–220°, as described in Example III, gives 4-amino-6-benzoyl-7-hydroxy-2-(o-tolyl)pteridine.

EXAMPLE X

Reaction of 4,6-diamino-2-(p-bromophenyl)-5-nitrosopyrimidine with ethyl p-trifluoromethylbenzoylacetate at 200–220°, as described in Example III, gives 4-amino-2-(p-bromophenyl) - 7 - hydroxy - 6 - (p - trifluoromethylbenzoyl)pteridine.

EXAMPLE XI

Reaction of 4,6-diamino-2-(3,4-dichlorophenyl)-5-nitrosopyrimidine with ethyl benzoylacetate at 200–220°, as described in Example III, gives 4-amino-2-(3,4-dichlorophenyl)-6-benzoyl-7-hydroxypteridine.

When the compounds of the invention are employed as diuretics and antiviral agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing conventional excipients, or in the form of solutions; or they may be injected parenterally, that is intramuscularly, intravenously or subcutaneously. For parenteral administration they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects, and preferably at a level that is in the range of from about 0.5 gm. to about 1.0 gm. per kg. of body weight per day, although as aforementioned variations will occur. However, a dosage level that is in the range of from about 700 mg. to about 900 mg. per kg. of body weight per day is most desirably employed in order to achieve effective results.

I claim:
1. A compound of the formula:

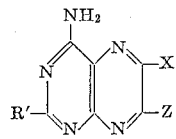

wherein R' is phenyl, halophenyl, thienyl, lower alkylphenyl, lower alkoxyphenyl, halo(lower) or alkylphenyl, X is COOR where R is methyl or ethyl; or $COR^2$ where $R^2$ is phenyl, halophenyl, lower alkylphenyl, lower alkoxyphenyl or haloalkylphenyl; Z is hydroxy or $R^2$.

2. 4 - amino - 2,7 - diphenyl - 6 - pteridinecarboxylic acid, ethyl ester.

3. 4 - amino - 2 - (p - chlorophenyl) - 7 - phenyl - 6 - pteridinecarboxylic acid, ethyl ester.

4. 4 - amino - 6 - benzoyl - 7 - hydroxy - 2 - phenylpteridine.

5. 4 - amino - 6 - benzoyl - 2 - (p - chlorophenyl) - 7 - hydroxy-pteridine.

6. A method of preparing a mixture or at least two of the compounds of the group claimed in claim 1, wherein one compound is an alkyl ester of 6-pteridinecarboxylic acid and the other compound is a 6-benzoylpteridine, which comprises:

heat-reacting a 4,6-diamine-5-nitrosopyrimidine of the formula:

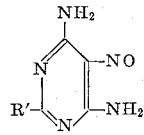

wherein $R^1$ is as defined in claim 1, with an alkyl benzoylacetate of the formula:

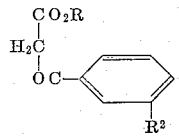

wherein R and $R^2$ are as defined in claim 1, at a temperature within the range of from about 150° C. to about 200° C.

7. A method as defined in claim 6 wherein:
the reaction mixture formed is cooled, an alkanol is added thereto, and then said two compounds are separated from each other.

8. A method as defined in claim 6 wherein:
the heat-reaction is performed in the temperature range of from about 150° C. to about 180° C. until the reaction is substantially completed, and then the alkyl ester of 6-pteridinecarboxylic acid is isolated as a precipitate.

9. A method as defined in claim 6 wherein:
the heat-reaction is performed at a temperature of about 200° C. for only about an hour, and the resulting 6-benzoylpteridine is separated from the acid product by extracting the latter from the reaction mixture with a boiling alkanol solvent to leave the 6-benzoylpteridine as a solid.

No references cited.

NICHOLAS S. RIZZO, *Primary Examiner.*